INVENTOR
JOHN F. HYSLER
BY
ATTORNEYS

Jan. 24, 1961   J. F. HYSLER   2,969,467
FREQUENCY REGULATION SYSTEM FOR GENERATORS
Filed Oct. 30, 1958   4 Sheets-Sheet 4

INVENTOR
JOHN F. HYSLER
BY
ATTORNEYS

United States Patent Office 2,969,467
Patented Jan. 24, 1961

2,969,467

FREQUENCY REGULATION SYSTEM FOR GENERATORS

John F. Hysler, Westport, Conn., assignor to Electric Regulator Corporation, Norwalk, Conn., a corporation of New York Filed Oct. 30, 1958, Ser. No. 770,864

20 Claims. (Cl. 307—57)

The present invention relates to an electrical system for regulating the frequency of output of an alternator by sensing characteristics of the alternator output and producing a signal for energizing a device which controls, directly or indirectly, the speed of rotation of the alternator.

Accurate control of frequency of an alternator output is a long standing problem the importance and difficulty of which increases almost daily as alternators are used to power devices the accuracy of which becomes increasingly sensitive to the frequency of the power supply. This is particularly the case for much military equipment the motive power for which must be derived from portable motor-generator sets. In these sets the engine, usually of the internal combustion type, such as a diesel engine, drives the alternator. Means must be provided for sensing the output of the alternator and for controlling the energization of the engine or other driving means in accordance with the sensed alternator output in order to maintain the speed of rotation of the alternator, and hence of the engine or other driving means, at a predetermined value. The control system must be capable of compensating rapidly for radical changes in load applied to the alternator, the application of increased load tending to slow down the alternator and hence decrease the output frequency and the removal of load tending to permit the alternator to speed up and hence increase its output frequency. The frequency must not only be brought back to desired value, but the control system must be capable of doing so in as short a period as possible. For example, one existing specification requires that the frequency be maintained within ¼ of 1% of rated value at any constant load, with frequency modulation not exceeding one cycle per second, and that even under the most extreme conditions of load change at no time shall the frequency drop below 1½% of rated frequency, the frequency to be restored to within ¼% of rated frequency within one second.

The system of the present invention readily attains these objectives, and does so by means of electric circuitry much simpler, less expensive and more reliable than has heretofore been the case. In addition, the system is adjustable within limits so as to have a flat, droop or compounded regulating characteristic, thus permitting it to be matched with other frequency control or governor systems or to have a desired regulating characteristic independent of other systems. Special circuitry permits the system to be paralleled with other similar systems controlling other motor-generator sets so that the paralleled sets will equally share the load placed upon them. Means are provided for sensing rapid and radical changes in load and for instantaneously preconditioning the control system to respond more rapidly than normal when such rapid load changes occur. Hence a highly refined system is produced the operating characteristics of which are exceptionally meritorious.

In this system, as in practically all frequency control systems, the frequency of the alternator output is sensed and a control signal is produced corresponding to that sensed frequency. To control by means of a signal derived solely from the frequency of the alternator output would not give the required accuracy or speed of response. Accordingly, in the present system means are provided for sensing the load on the alternator by detecting the magnitude of that portion of the alternator current in phase with the voltage, deriving a signal corresponding thereto, sensing changes in that signal, and modifying the control signal in accordance with the thus sensed changes in alternator load. Thus if load is suddenly applied the control signal will be supplied with what is in effect a pulse of energy which will overcome the inertia of the control instrumentality and cause it to respond more rapidly to the actual change in output frequency as that is sensed. In other words, with a rapid change in load, which will be reflected in a rapid change in the magnitude of in-phase current in the alternator output, the control instrumentality will be forced into rapid response. The "forcing" or "anticipatory" signal derived from sensing changes in the in-phase alternator output current also adds to the stability of the overall control system, since the rate of change of load required to produce a given signal modification can be matched to the time constant of the motor-generator set itself.

Various other advantages derive from the sensing of in-phase current in the alternator output. Since the magnitude of that current will vary with the load on the alternator, a steady state signal may be derived therefrom (to be distinguished from the instantaneous "forcing" signal above described), which may be combined with the other signals, and particularly the frequency sensing signal, to modify those other signals either positively or negatively so as to produce a droop or compounding regulation characteristic of desired magnitude. If a flat response is desired this so-called "droop adjustment" may be set to zero, in which case the load will be ineffective to modify the control signal. When two alternators are to be paralleled the signal derived from the in-phase current of each alternator may be combined in opposition to produce a resultant signal which is, in each system, combined with the other signals in such a way as to increase the load-handling capacity of the underloaded motor-generator set and decrease the load-handling capacity of the overloaded motor-generator set, thus causing the paralleled sets to share the load equally.

The circuitry employed to detect the in-phase current of the alternator output is particularly significant because it represents a marked advance over the prior art with regard to simplicity, weight, space and expense. The voltage from each phase of the alternator output is applied, via a voltage transformer, across a pair of resistors, a connection being provided from a point between the resistors to a point intermediate the ends of the voltage transformer secondary winding, thus producing two conductive loops with a common central path. Similarly oriented rectifiers are inserted in each loop circuit. An additional resistor is positioned in the circuit at an appropriate point and is connected between the ends of the secondary winding of a current transformer in the alternator phase in question. The arrangement is such that the effect of the current transformer on this additional resistor will unbalance the current flowing in the two first mentioned resistors only insofar as the alternator current is in-phase with the alternator voltage. This unbalance will be evidenced by a potential difference across the ends of the two first mentioned resistors, that potential difference constituting a signal proportional to the magnitude of the in-phase current and independent of the voltage. It is noteworthy that this signal is produced by a circuit involving but a single transformer having two secondary windings (or a single tapped secondary winding) and two rectifiers.

In the system of the present invention the actual control signal is derived from the power winding of a magnetic amplifier, that amplifier having a plurality of control windings for the various signals which are to be taken into account. Thus there is one control winding which is energized by the frequency signal, another by the "forcing" signal, another by the "droop adjustment" signal, and still another by the resultant signal utilized when motor generator sets are paralleled. In this way the various signals are effectively combined without deleterious interaction, and the final control signal has sufficient power so that it can actuate a control instrument capable of modifying the speed of rotation of the alternator. While the system of the present invention could be used with many different types of speed control, and for controlling the speed of many different types of alternator-driving means (D.C. or A.C. motors, gasoline or diesel engines), the system is exceptionally well adapted for use with an electromagnetic actuator directly active upon the fuel control valve of a diesel engine, such as is specifically disclosed in the copending application of Arthur M. Cohen and David A. Blevins, Serial No. 771,307, filed November 3, 1958, entitled "Electric Governor for Internal Combustion Engine or the Like." and assigned to the assignee of the instant invention.

To the accomplishment of the above and to such other objects as may hereinafter appear, the present invention relates to a system for regulating the frequency of output of an alternator and to various circuit arrangements employed therein, as defined in the appended claims, and as described in this specification, taken together with the accompanying drawings, in which:

Figure 2:
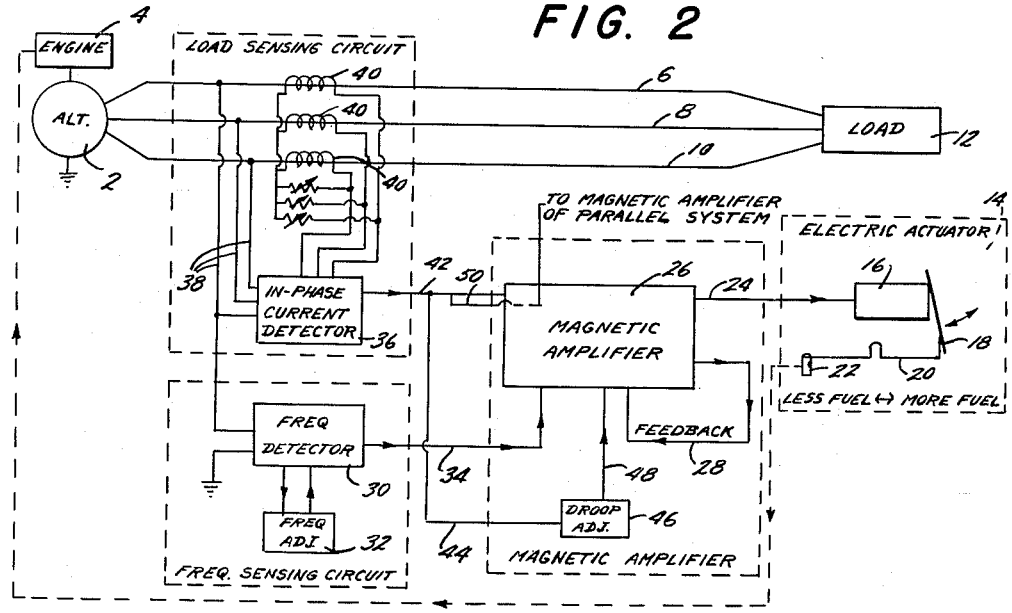
Fig. 2 is a schematic block diagram of the system of the present invention.

Referring first to Fig. 2, an alternator 2 is driven by a driving means 4 which may, for example, take the form of a diesel engine. The output of the alternator, here shown as three-phase, is carried by lines 6, 8 and 10 to a load 12. Means 14 is provided for controlling the speed of the engine 4, and thus the speed of rotation and frequency of output of the alternator 2, that means taking the form, for example, of an electric actuator comprising an electromagnetic coil 16 active upon an armature 18, the armature being connected by link 20 to a valve 22 which controls the flow of fuel to the engine 4. The coil 16 is adapted to be energized by a control signal indicated by the line 24, that signal emanating from a magnetic amplifier 26 the power winding of which is connected in conventional feedback manner, as indicated at 28. The actual frequency of the alternator output voltage is sensed by frequency detector 30, provided with an adjusting means 32 so that the precise regulated frequency can be selected. A signal represented by the line 34 is fed to a control winding of the magnetic amplifier 26, thereby to vary the magnitude of the signal 24. An in-phase current detector 36 is connected to the alternator output both voltage-wise, via lines 38, and currentwise, via current transformers 40, and it produces a signal represented by the line 42 which is fed to the magnetic amplifier and combines with the signal 34. A portion 44 of the signal 42 is fed to a droop adjustment circuit 46, from which another signal, represented by the line 48, goes to the magnetic amplifier. Another portion of the signal 42, represented by the line 50, goes to the magnetic amplifier 26 and also to the magnetic amplifier of a paralleled system in the event that paralleling is desired. The signals 34, 42, 48 and 50 all combine to vary the magnitude of the final control signal 24 which in turn varies the energization of the engine 4 in order to keep the output frequency constant.

Figure 1:
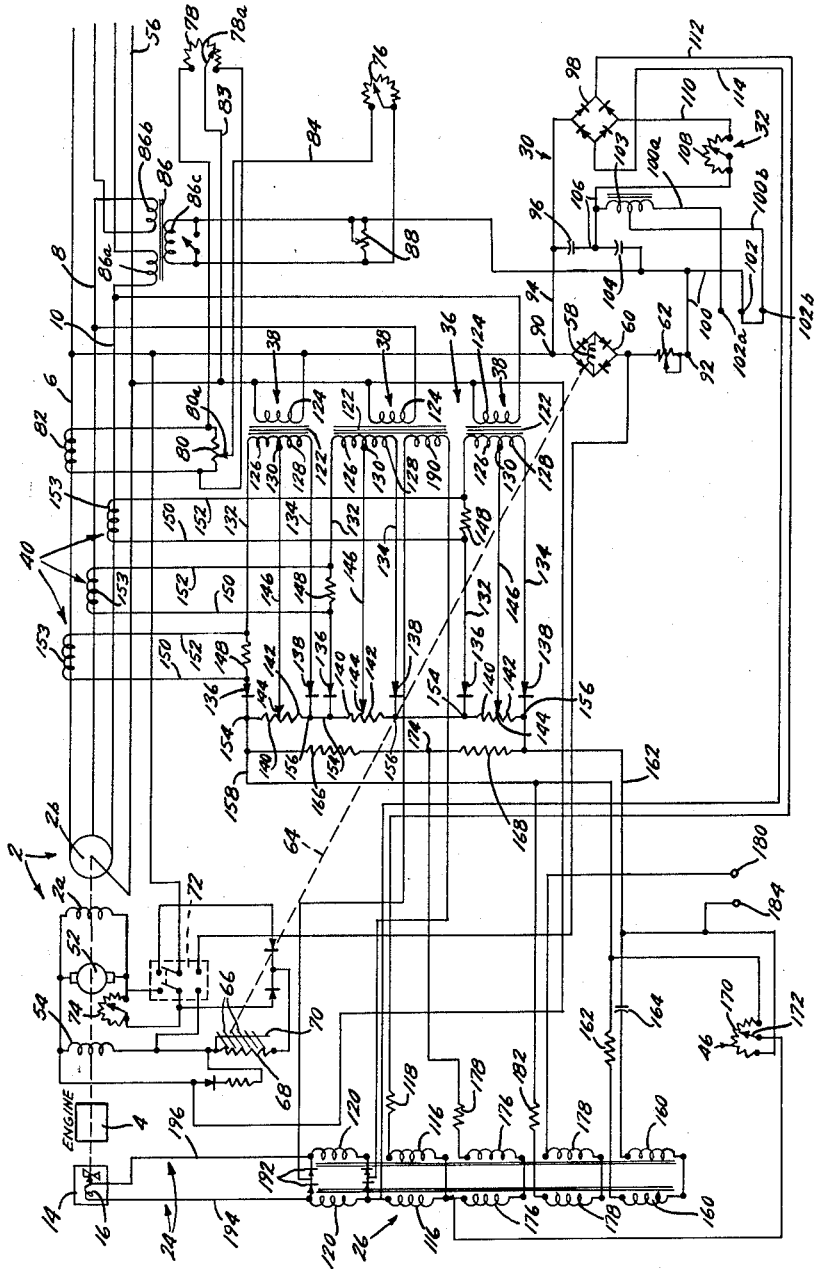
Fig. 1 is a combined circuit and schematic diagram of the system of the present invention, with which a voltage regulation system is combined for increased accuracy.

Referring now to Fig. 1, the alternator 2 comprises a field 2a and an armature 2b, the field 2a being energized by the armature 52 of an exciter having a field 54. The engine 4 drives both the exciter and the alternator. Disclosed in Fig. 1, and not essential to the operation of the system of the present invention, but making for somewhat greater accuracy in the functioning thereof, is a voltage regulation system utilizing a finger-type electromagnetic unit such as that disclosed in Cohen Patent 2,707,735 of May 3, 1955, entitled "Finger-Type Circuit Regulator With Auxiliary Circuit-Breaking Arrangement." Accordingly, voltage sensing coil 58, connected across a full wave rectifier 60 which is in series with adjustable voltage dropping resistor 62, is connected between alternator line 6 and ground line 56. The coil 58 is operatively connected, as indicated by the broken line 64, with a plurality of finger contacts 66 connected to various points along a resistor 68 and caused sequentially to engage with and become disengaged from a shorting bar 70, thereby varying the magnitude of the resistance 68 in series with the exciter field winding 54 in accordance with the sensed voltage output of the alternator 2, thereby to maintain the alternator voltage constant, all as is well known. As here specifically illustrated the exciter-alternator combination is provided with a selector switch 72 which, when in the lower position, corresponding to automatic voltage regulation, puts the variable resistor 68 in circuit with the exciter field winding 54, and when in the upper position, corresponding to manual control, puts a manually adjustable resistance 74 in circuit with the exciter field winding 54. Adjustable resistor 76 is connected between the resistor 62 and ground line 56, the setting of resistor 76 determining the regulated value of the alternator output voltage.

As refinements in the voltage regulating system, manually adjustable resistor 78 and resistor 80 are connected in parallel across the output of current transformer 82, adjustable arm 78a for resistor 78 being connected by line 83 to ground line 56 and adjustable arm 80a on resistor 80 being connected by line 84 to voltage adjustment resistor 76. In accordance with the setting of the arms 78a and 80a a voltage related to the in-phase current in alternator output line 6 may be added to the voltage applied to the regulator coil 58. In this way compensation for voltage line drop can be accomplished. The greater the in-phase current, the greater will be the voltage drop along the line. By means of the above described circuitry the regulated voltage at the alternator end of the line can be increased over rated value, for any given in-phase line current, by an amount just sufficient to cancel out the line voltage drop, thus providing for the application of constant voltage at the load 12. The use of current transformer 86 having primary windings 86a and 86b in lines 8 and 10 respectively, each active in opposite senses on secondary coil 86c connected across adjustable resistor 88, will permit the paralleling of voltage-regulated alternators.

Figure 5:
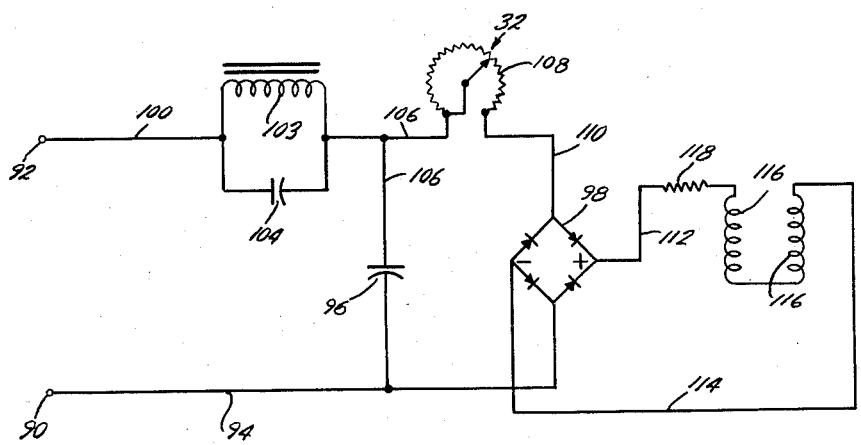
Fig. 5 is a circuit diagram of the frequency sensing circuit.

Turning now to the frequency control system per se, the frequency sensing circuit 30 is shown in detail in Fig. 5. In the system of Fig. 1 it is connected across points 90 and 92 which, in the voltage regulated circuit specifically disclosed, will always be at a constant voltage. Point 90 is connected by line 94 to one end of capacitor 96 and to one end of full wave rectifier 98. Point 92 is connected by line 100 to inductance 103 and capacitor 104 connected in parallel, the other end of that parallel circuit being connected by line 106 to the other side of the capacitor 96 and to adjustable resistor 108, which is in turn connected by line 110 to the rectifier 98. The D.C. output from the rectifier 98 is carried by lines 112 and 114 to control winding 116 on magnetic amplifier 26, a resistor 118 being interposed in one of the lines 112 or 114. In Fig. 1 line 100 terminates at point 102, lines 100a and 100b, terminating in points 102a and 102b respectively, leading respectively to the end and an intermediate point on the inductance 103. By connecting point 102 to point 102a or 102b the effective value of the inductance 103 is changed. The network 103, 104, 96 thereby defines a frequency sensitive circuit the voltage across which will be dependent upon the frequency applied thereto, the value of the circuit elements determining the range of frequencies to which the circuit will be particularly sensitive. The signal derived from that network is rectified and, in passing through the magnetic amplifier control winding 116, controls the current in the magnetic amplifier power winding 120. The setting of the resistor 108, by controlling the level of operation of the magnetic amplifier 26, will control, within limits, the regulated frequency. Thus if the frequency sensitive network is designed for nominal operation at 60 cycles per second, the adjustable resistor 108 can control the regulated frequency between 58 and 62 cycles per second. Connection of point 102 to point 102a or 102b will condition the frequency sensitive circuit for operation respectively at 50 and 60 cycles per second.

Figure 3:
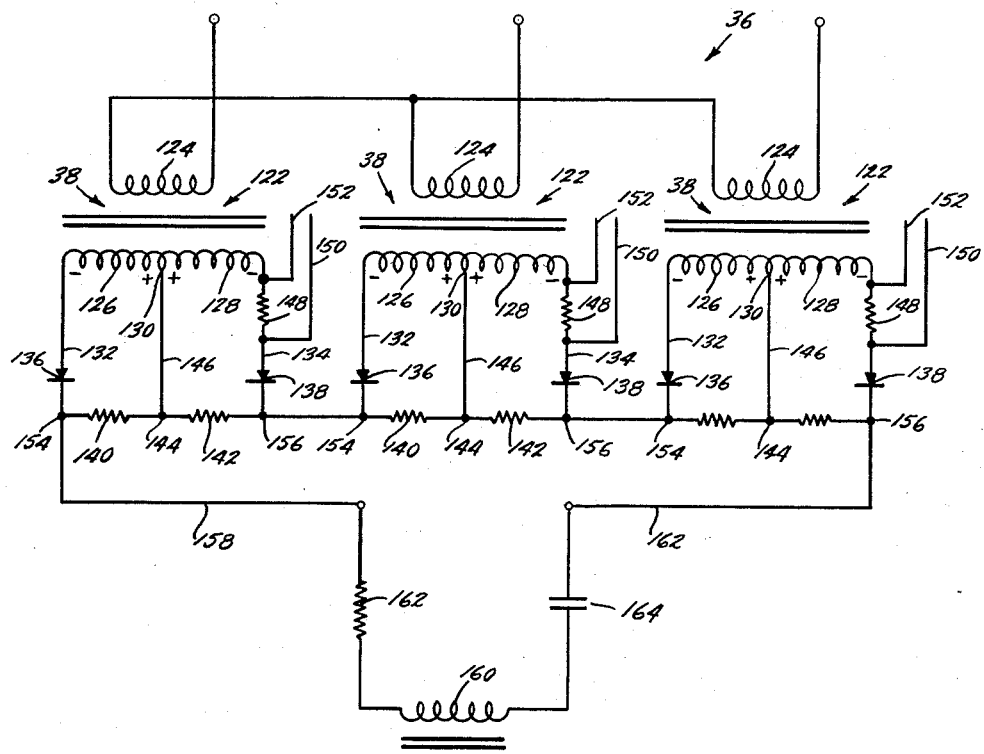
Fig. 3 is a circuit diagram illustrating one embodiment of the in-phase current sensing circuit, showing it connected to the circuit for deriving a "forcing" signal corresponding to the rate of change of load.

The in-phase current detector circuit 36 of Fig. 1 is also shown in Fig. 3. It comprises three voltage transformers 122, one for each phase of the alternator output, each comprising a primary winding 124 and, in effect, a pair of secondary windings 126 and 128. Adjacent ends of the windings 126 and 128 are connected together at 130. The other ends of the secondary windings 126 and 128 are connected by lines 132 and 134 respectively to similarly oriented rectifiers 136 and 138 respectively, the rectifiers in turn being connected to resistors 140 and 142 respectively, the ends of which are connected together at 144, the points 130 and 144 being connected by line 146. A resistor 148 is located in one of the lines 132 or 134 (shown as 134 in Fig. 3 and 132 in Fig. 1), and connected across the resistor 148 are lines 150 and 152 coming from the secondary winding of a current transformer 153 located in the same alternator output phase as the voltage transformer primary winding 124. The voltage secondary windings 126 and 128 are oppositely polarized, that is to say, for each of the windings 126 and 128 the same relative voltage or polarity will exist on either side of point 130, as shown in the drawings for a given half cycle in each phase. Hence during that half cycle when the secondary windings 126 and 128 are polarized in the same way as the rectifiers 136 and 138, current will flow through both the right hand and left hand loops respectively including resistors 140 and 142 and the common line 146. The resistors 140 and 142 are equal in magnitude, voltage-induced current flows through them in opposite directions, and consequently, when voltage alone is considered, no potential difference will be present across points 154 and 156.

When current flows through the alternator output phase in question the current transformer 154 will cause a current to flow through the resistor 148, thus causing a voltage to appear across that resistor. That component of alternator output current which is 90 degrees out of phase with the alternator output voltage will have no effect on the detecting circuit, since the voltage produced thereby in resistor 148 will be effective at a time when no voltage induced current is flowing through the detection circuit. The component of the alternator output current in phase with the alternator output voltage will, however, produce a voltage across the resistor 148 which will unbalance the circuit, causing, for example, more current to flow through the loop containing resistor 142 than through the other loop containing resistor 140. Consequently there will be a greater voltage drop in resistor 142 than in resistor 140, and a potential difference will appear across the points 154 and 156, that potential difference being proportional to the magnitude of the in-phase current in the alternator output line. Where, as here disclosed, three phase sensing is employed, a separate circuit is employed for each phase and the resistors 140 and 142 for each phase are connected in series, the potential differences across the points 154 and 156 for each phase thus being additive. It will be appreciated, therefore, that this potential difference constitutes a signal proportional to the in-phase current (active load current) in the alternator output lines 6, 8 and 10.

When there is a rapid change in load on the alternator 2, which will tend to cause a marked change in the frequency of the alternator output, there will be a correspondingly marked change in the in-phase alternator output current, and as a result the voltage across points 154 and 156 will change rapidly. Line 158 connects points 154 to one end of magnetic amplifier control winding 160 via resistor 162, the other end of that control winding 160 being connected to point 156 via line 162 and capacitor 164. By suitable proportioning of the valves of the resistor 162 and capacitor 164 the circuit 162, 164 can be given a time constant corresponding to that of the motor-generator set being controlled. For gradual changes in in-phase current substantially no current will flow through the winding 160, but when there is a rapid change in in-phase current (when the voltage across points 154 and 156 varies rapidly) there will be a surge or pulse of current through the winding 160, which will decay in accordance with the time constant of the circuit 162, 164. During the duration of this signal pulse or surge the current in the magnetic amplifier power winding 120 will be correspondingly increased or decreased, depending upon the sense of the pulse, thereby to provide a pulse or surge of power change active on the electric actuator 14 in order to cause it to respond more quickly than would otherwise be the case.

Figure 7:
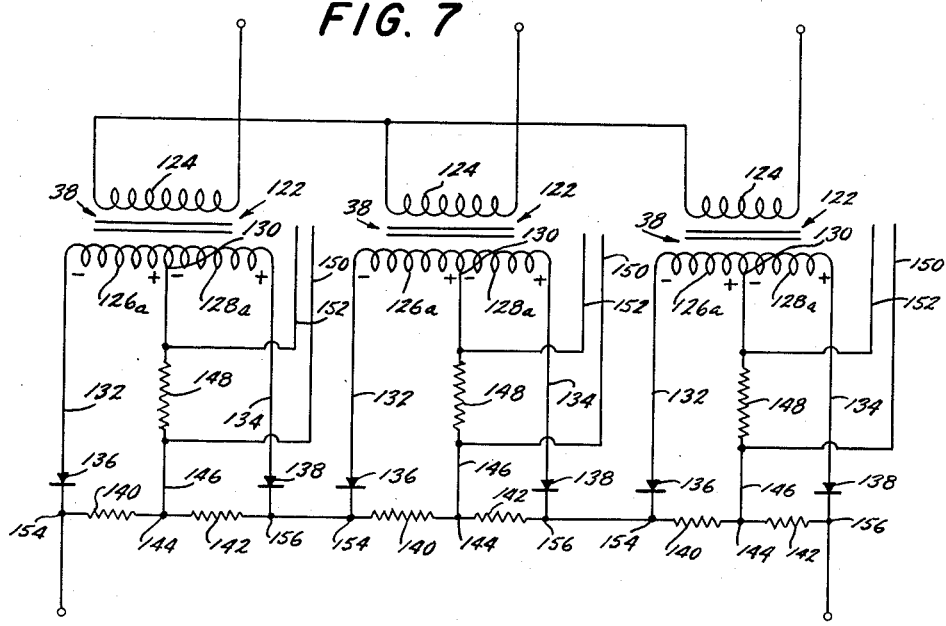
Fig. 7 is a circuit diagram illustrating an alternative embodiment of the in-phase current detecting circuit.

Fig. 7 discloses an alternative in-phase current detection system generally similar to that of Fig. 3, similar reference numerals being utilized where appropriate. In the circuit of Fig. 7 the secondary windings 126a and 128a are, in contradistinction to the circuit of Fig. 3, similarly polarized, that is to say, opposite relative polarities exist on opposite sides of the point 130, as indicated on the drawing. The resistor 148 in the circuit of Fig. 7 is located in the common line 146. In this circuit the loops comprising secondary winding 126a, rectifier 136 and resistor 140 on the one hand and secondary winding 128a, rectifier 138 and resistor 142 on the other hand are alternately current-conducting in each half cycle, current passing through the common line 146 and the resistor 148 on both half cycles in the same direction. The in-phase voltage produced in the resistor 148 from the current transformer 154 will on one-half cycle aid the current flow therethrough and on the next half cycle will oppose that current. Thus, with the circuit of Fig. 7, a greater potential difference will be produced across the points 154 and 156 for a given magnitude of in-phase alternator output current than is the case with the circuit of Fig. 3.

Figure 4:
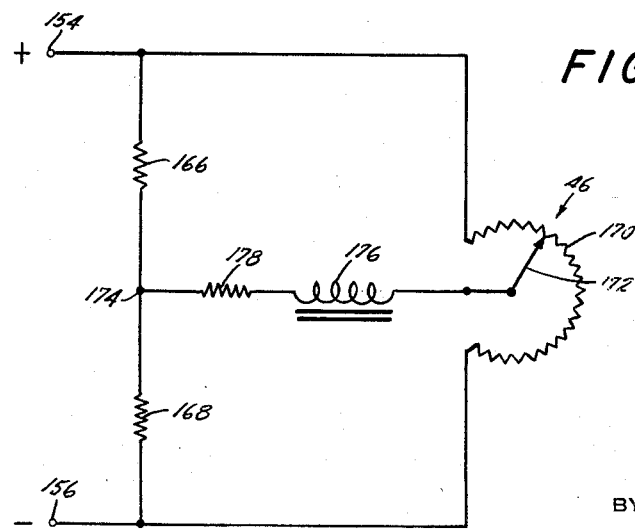
Fig. 4 is a circuit diagram illustrating the droop or compounding adjustment circuit.

The droop adjustment circuit is disclosed in Fig. 4. A bridge circuit is connected across the points 154 and 156, one side of that bridge being defined by resistors 166 and 168, the other side being defined by resistor 170 with adjustably positionable tap arm 172. Connected between the arm 172 and point 174, located between the resistors 166 and 168, is magnetic amplifier control winding 176 in series with resistor 178. Depending upon the setting of the tap arm 172 a current will flow through the control winding 176 in one direction or the other, or if the tap arm 172 is set to balance the bridge no current will flow therethrough. When the bridge is unbalanced the magnitude of the current flowing through the control winding 176 will be proportional to the in-phase output current (the voltage across points 154 and 156). Thus by the setting of the tap arm 172 the relationship of regulated frequency to load (in-phase output current) can be adjusted so as to provide a flat response, a droop response or a compounding response as desired.

Figure 6:
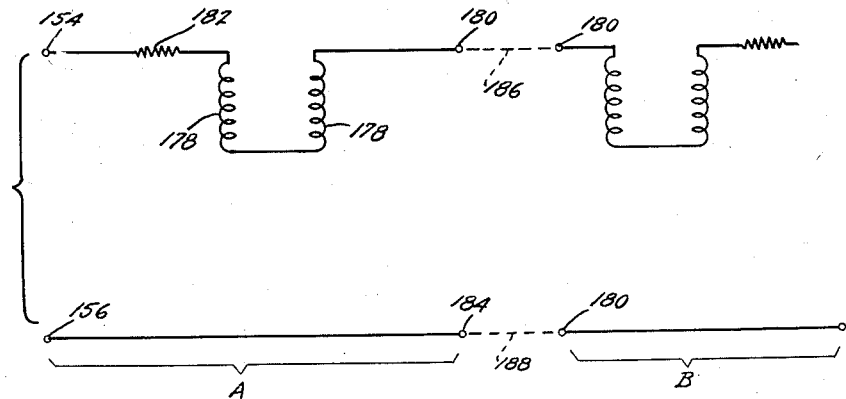
Fig. 6 is a circuit diagram illustrating the load equalization circuit used with motor-generator sets connected in parallel.

When two alternators are connected in parallel some means is required to ensure that the load will be equally divided between them. Otherwise a situation will tend to exist where one alternator supplies substantially all the load and becomes overloaded while the other alternator runs substantially idle. In order to provide for proper allocation of load between a pair of alternators connected in parallel yet another magnetic amplifier control winding 178 is provided connected between an external terminal 180 and point 154 on the in-phase current detection circuit 36, a resistor 182 being interposed in that line, external terminal 184 being connected to point 156 on the in-phase current detection circuit 36. Since this arrangement is duplicated in the other alternator, as indicated by the sections A and B of Fig. 6, if the points 180 and 184 on each alternator A and B are connected together, as indicated by the broken lines 186 and 188, the control windings 178 in the two alternators A and B will be connected in opposition. Those windings, it will be remembered, are energized by a voltage proportional to the in-phase current in the output of their respective alternators A or B. Since the windings 178 for the two alternators are connected in opposition, if both alternators are taking the same amount of load there will be no effective current in the windings 178. If the load on one alternator should increase, its in-phase current will increase, its winding 178 will tend to be energized more than the winding 178 of the other alternator control system, and a resultant current will flow through the control windings 178 for both alternators in such a sense as to cause the underloaded alternator to take care of more load and to cause the overloaded alternator to take care of less load.

The magnetic amplifier control winding 120 is energized from voltage transformer secondary winding 190, and is provided with rectifier connections 192 providing the feedback 128 which gives rise to true magnetic amplifier action. The output from the winding 120 is connected by leads 194 and 196 to the coil 16 of the electric actuator 14, an increase in the energization of the coil 16 causing a decrease in the amount of fuel fed to its engine 4 and vice versa.

The operation of the control of the present invention will in the main be apparent from the above description of its components. If the output frequency should increase an increased current will pass through the control winding 116, the output from the power winding 120 will increase, the electric actuator coil 16 will be increasingly energized, and the fuel supply to the engine 4 will be decreased to cause it to slow down and bring the frequency to desired value. This action will be modified in accordance with the load on the alternator 2, as indicated by the magnitude of the in-phase output current, in accordance with the setting of the tap arm 172 on the droop adjustment resistor 170, and will be further modified, when alternators are connected in parallel, by any resultant signal current which might flow through the control winding 178. When there is a rapid change in load, a signal of short duration will be applied to the control winding 160 in order to provide a surge of extra power to cause the actuator 14 to respond more rapidly.

The values of the circuit components will, of course, vary in accordance with the desired results and with the characteristics of the motor generator set being regulated. Purely by way of exemplification the following circuit values may be employed for regulation at 60 cycles per second: capacitor 96—5 mf., capacitor 104—100 mf., resistor 118—250 ohms, resistors 140 and 142—150 ohms each, resistor 148—3 ohms, resistor 162—100 ohms, resistor 166—2330 ohms, resistor 168—685 ohms, resistor 178—500 ohms, resistor 182—5000 ohms.

With the system of the present invention precise, rapid frequency control and regulation may be achieved by means of simple, dependable circuitry, and exacting specifications can be met. The required equipment is smaller, lighter, less expensive and more dependable than prior systems. The regulated frequency may be adjusted within limits, the regulating characteristics may be controlled to meet a desired application or to permit an alternator controlled by this system to be paralleled with any other isochronous governor, and special provision is made for matching speed of response of the system to match the characteristics of the particular motor generator set being controlled and to provide extra power for high speed of response when that is necessary.

While but a single embodiment of the present invention has been here specifically disclosed, it will be apparent that many variations may be made therein, all within the scope of the instant invention as defined in the following claims.

I claim:

1. A system for regulating the frequency of output of an alternator by controlling the speed of rotation of the alternator driving means, said system comprising means for deriving a first signal corresponding to the frequency of said alternator output, a second signal corresponding to the rate of change of in-phase current in said output, and a third signal corresponding to the magnitude of said in-phase current, and means for combining said first, second and third signals into a final signal operatively connected to said driving means for varying the energization thereof and thus controlling its speed of rotation.

2. In the system of claim 1, a magnetic amplifier having power and control windings, said first, second and third signals being fed to said control windings, said power winding being energized by a voltage source, the current in said power winding defining said final signal.

3. In the system of claim 1, means for adjusting said third signal between zero and a predetermined maximum value in either direction from zero.

4. In combination, two alternators each having a separate driving means controlled by a separate system of claim 1, each of said systems comprising means for deriving a fourth signal corresponding to the magnitude of in-phase current in the output of its alternator, said fourth signals of each system being connected in opposition to produce a resultant signal, and means for combining said resultant signal with said first, second and third signals in each of said systems.

5. A system for regulating the frequency of output of an alternator by controlling the speed of rotation of the alternator driving means comprising means for deriving a first signal corresponding to the frequency of said alternator output and a second signal corresponding to the rate of change of in-phase current in said output, and means for combining said first and second signals into a final signal operatively connected to said driving means for varying the energization thereof and thus controlling its speed of rotation.

6. In combination, two alternators each having a separate driving means controlled by a separate system of claim 5, each of said systems comprising means for deriving a third signal corresponding to the magnitude of in-phase current in the output of its alternator, said third signals of each system being connected in opposition to produce a resultant signal, and means for combining said resultant signal with said first and second signals in each of said systems.

7. A paralleling system for the regulation of the frequency of output of a pair of alternators each having a separate driving means controlled by its individual control system, each of said systems producing a final control signal operatively connected to said driving means for varying the energization thereof and thus controlling its speed of rotation, said paralleling system comprising means in each individual system for deriving a signal corresponding to the magnitude of the in-phase current in the output of its associated alternator, said signals of each system being connected in opposition to produce a resultant signal, and means for incorporating said resultant signal into the final signal of each system.

8. In combination with an alternator having an output circuit, a signal circuit for producing a signal proportional to the in-phase current in said output circuit, said signal circuit comprising a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, said signal being produced across said signal resistors.

9. The combination of claim 8, in which said windings are similarly polarized from their first to their second ends, and in which said additional resistor is located in one of said paths.

10. The combination of claim 8, in which said windings are oppositely polarized from their first to their second ends, and in which said additional resistor is located in said connection.

11. In a system for regulating the frequency of output of an alternator by sensing the output thereof and controlling the means which drives the alternator in accordance therewith, said system including means for sensing the output frequency and deriving a control signal in accordance therewith; the improvement which comprises deriving a signal proportional to the in-phase current of said alternator output, sensing rapid changes in said signal, producing an auxiliary signal corresponding to said changes, and combining said auxiliary signal with said control signal, thereby to increase the speed of response of said system when rapid changes in load occur.

12. In a system for regulating the frequency of output of an alternator by sensing the output thereof and controlling the means which drives the alternator in accordance therewith, said system including means for sensing the output frequency and deriving a control signal in accordance therewith; the improvement which comprises deriving a signal proportional to the in-phase current of said alternator output, and combining a predetermined portion of said signal with said control signal in order to modify the droop or compounding characteristics of said system.

13. In a system for regulating the frequency of output of an alternator by sensing the output thereof and controlling the means which drives the alternator in accordance therewith, said system including means for sensing the output frequency and deriving a control signal in accordance therewith; the improvement which comprises deriving a signal proportional to the in-phase current of said alternator output, passing said signal through a series R-C circuit, the current through said circuit defining an auxiliary signal, and combining said auxiliary signal with said control signal, thereby to increase the speed of response of said system when rapid changes in load occur.

14. In a system for regulating the frequency of output of an alternator by sensing the output thereof and controlling the means which drives the alternator in accordance therewith, said system including means for sensing the output frequency and deriving a control signal in accordance therewith; the improvement which comprises deriving a signal proportional to the in-phase current of said alternator output, sensing rapid changes in said signal, producing an auxiliary signal corresponding to said changes, and combining said auxiliary signal with said control signal, thereby to increase the speed of response of said system when rapid changes in load occur, and combining a predetermined portion of said signal proportional to the in-phase current of said alternator output with said control signal in order to modify the droop or compounding characteristics of said system.

15. In a system for regulating the frequency of output of an alternator by sensing the output thereof and controlling the means which derives the alternator in accordance therewith, said system including means for sensing the output frequency and deriving a control signal in accordance therewith; the improvement which comprises deriving a signal proportional to the in-phase current of said alternator output, passing said signal through a series R-C circuit, the current through said circuit defining an auxiliary signal, and combining said auxiliary signal with said control signal, thereby to increase the speed of response of said system when rapid changes in load occur, and combining a predetermined portion of said signal proportional to the in-phase current of said alternator output with said control signal in order to modify the droop or compounding characteristics of said system.

16. In a system for regulating the frequency of the output circuit of an alternator by sensing the output thereof and controlling the means which drives the alternator in accordance therewith, said system including means for sensing the output frequency and deriving a control signal in accordance therewith; the improvement which comprises a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, a voltage proportional to the in-phase current in said output circuit therefore appearing across said signal resistors in series, said signal resistors being connected to a circuit for sensing rapid changes in said voltage and producing an auxiliary signal corresponding to said changes, and means for combining said auxiliary signal with said control signal, thereby to increase the speed of response of said system when rapid changes in load occur.

17. In a system for regulating the frequency of the output circuit of an alternator by sensing the output thereof and controlling the means which drives the alternator in accordance therewith, said system including means for sensing the output frequency and deriving a control signal in accordance therewith; the improvement which comprises a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, a voltage proportional to the in-phase current in said output circuit therefore appearing across said signal resistors in series, and means for combining a predetermined portion of said voltage with said control signal in order to modify the droop or compounding characteristics of said system.

18. In a system for regulating the frequency in the output circuit of an alternator by sensing the output thereof and controlling the means which drives the alternator in accordance therewith, said system including means for sensing the output frequency and deriving a control signal in accordance therewith; the improvement which comprises a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, a voltage proportional to the in-phase current in said output circuit therefore appearing across said signal resistors in series, said signal resistors being connected to a series R-C circuit, the current through said circuit defining an auxiliary signal, and means for combining said auxiliary signal with said control signal, thereby to increase the speed of response of said system when rapid changes in load occur.

19. In a system for regulating the frequency in the output circuit of an alternator by sensing the output thereof and controlling the means which drives the alternator in accordance therewith, said system including means for sensing the output frequency and deriving a control signal in accordance therewith; the improvement which comprises a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, a voltage proportional to the in-phase current in said output circuit therefore appearing across said signal resistors in series, said signal resistors being connected to a circuit for sensing rapid changes in said voltage and producing an auxiliary signal corresponding to said changes, means for combining said auxiliary signal with said control signal, thereby to increase the speed of response of said system when rapid changes in load occur, and means for combining a predetermined portion of said voltage with said control signal in order to modify the droop or compounding characteristics of said system.

20. In a system for regulating the frequency in the output circuit of an alternator by sensing the output thereof and controlling the means which drives the alternator in accordance therewith, said system including means for sensing the output frequency and deriving a control signal in accordance therewith; the improvement which comprises a voltage transformer the primary of which is connected to said output circuit so as to be energized by the voltage therein and the secondary of which comprises a pair of windings, a first point connected to first ends of both said windings, the second ends of said windings each being connected to a second point via a path including a rectifier and a signal resistor, said rectifiers being oriented for current flow in the same direction relative to said second point, a connection between said first and second points, an additional resistor in one of said connection and said paths, and a current transformer in said output circuit the primary of which is connected to said output circuit so as to be energized by the current therein and the secondary of which is connected across said additional resistor, a voltage proportional to the in-phase current in said output circuit therefore appearing across said signal resistors in series, said signal resistors being connected to a series RC circuit, the current through said circuit defining an auxiliary signal, means for combining said auxiliary signal with said control signal, thereby to increase the speed of response of said system when rapid changes in load occur, and means for combining a predetermined portion of said voltage with said control signal in order to modify the droop or compounding characteristics of said system.

References Cited in the file of this patent

UNITED STATES PATENTS

| | | |
|---|---|---|
| 2,121,609 | Powers | June 21, 1938 |
| 2,571,827 | Bradley | Oct. 16, 1951 |
| 2,703,862 | Gordon | Mar. 8, 1955 |
| 2,836,771 | Jessee | May 27, 1958 |